Patented Sept. 7, 1937

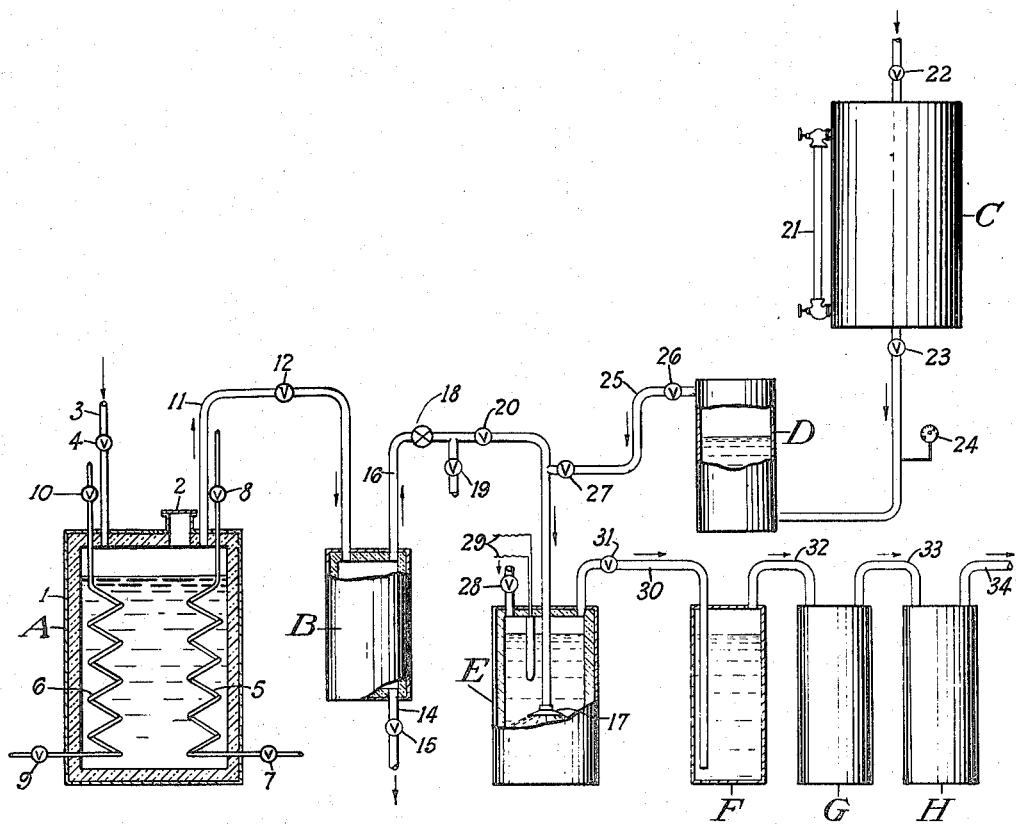

2,091,986

UNITED STATES PATENT OFFICE 2,091,986

PRODUCTION OF LOWER ALKYL CHLORIDES

Lee Cone Holt and Herbert Wilkens Daudt, Wilmington, Del., assignors to E. I. du Pont de Nemours & Company, Wilmington, Del., a corporation of Delaware Application June 4, 1935, Serial No. 24,974

6 Claims. (Cl. 260—162)

This invention relates to a new and improved process for the production of alkyl chlorides containing less than four carbon atoms from the corresponding alkyl alcohols, metal chlorides and sulfuric acid.

It is known that lower alkyl chlorides such as ethyl chloride can be produced by heating dilute sulfuric acid with sodium chloride and the corresponding alcohol. As an improvement upon this type of process it has been proposed to add a mixture of ethyl alcohol and concentrated sulfuric acid to a mixture of salt and dilute sulfuric acid and then pass the vapors containing hydrogen chloride, ethyl alcohol, ethyl chloride, water and ether into an aqueous solution of a metal halide catalyst capable of promoting reaction between the alcohol and hydrogen chloride. Such a process is described in a patent to Frei, U. S. Patent No. 1,824,951. Another patent to Frei, U. S. Patent No. 1,784,423 covers various types of catalyst solutions which are suitable for promoting the reaction between the alcohol and hydrogen chloride. A patent to the joint applicants in the present application, U. S. Patent No. 1,983,542 covers an improved method of carrying out the reaction between the hydrogen halide and the alcohol in the presence of the metal halide catalyst solution.

In practice it has been customary to produce the mixtures of alcohol and hydrogen chloride for addition to the heated catalyst solution by the method described by Frei in his U. S. Patent No. 1,824,951, that is, by forming the hydrogen chloride from sulfuric acid and an alkali metal chloride in the presence of the alcohol and its sulfuric acid ester, and then introducing the mixture of gases and vapors into the catalyst solution. This process has the disadvantage that some of the alcohol reacts with the sulfuric acid forming by-products such as ethers which represent very substantial losses in yield.

We have found that the loss from the formation of ether may be substantially eliminated by forming the hydrogen chloride separately, that is, in the absence of the alcohol and then bringing the hydrogen chloride and alcohol together in the catalyst solution. In carrying out processes of this type, however, it has also been found that impurities in hydrogen chloride, produced by the usual commercial processes, are very undesirable. Permanent gases, such as nitrogen and oxygen, are always present in hydrogen chloride produced commercially by heating together mixtures of sodium chloride and concentrated sulfuric acid at high temperatures. They cause extreme difficulties and excessive losses of yield during the production of the lower alkyl chlorides from hydrogen chloride and the alcohol, primarily due to difficulties in the condensation of the product.

Hydrogen chloride produced by the combination of elementary hydrogen and chlorine also contains sufficient amounts of permanent gases, such as hydrogen and nitrogen, to cause similar difficulties. In addition, chlorine which has undesirable chemical influences on the alkyl chloride production is frequently present in hydrogen chloride thus produced. Moreover, where the hydrogen chloride is produced per se by any of the usual commercial processes, it is difficult to properly control the addition of the alcohol and hydrogen chloride, and it is practically essential to segregate the hydrogen chloride production at a safe distance from the alkyl chloride operation in order to avoid serious fire and explosion hazards.

It is an object of the present invention to provide a new and improved process for producing alkyl chlorides containing less than four carbon atoms. A further object is to combine the production and utilization of hydrogen chloride in the alkyl halide synthesis into a single, coordinated, easily controllable operation. A more specific object is the provision of a new and improved process for the preparation of ethyl chloride. Other objects will appear hereinafter.

These objects are attained in accordance with the invention by separately forming hydrogen chloride by the reaction of a metal chloride with sulfuric acid having a concentration within the range of about 70 to about 87%, and then bringing the evolved hydrochloric acid vapors directly into contact with an alcohol containing less than four carbon atoms in an aqueous solution of a catalyst capable of promoting reaction between the hydrogen chloride and the said alcohol. We have found that by regulating the concentration of the sulfuric acid as described, the production of hydrogen chloride may be easily controlled and the hydrogen chloride process may be readily coordinated with the alkyl chloride synthesis in the immediate proximity thereof and without fire or explosion hazards.

The invention will be further illustrated by reference to the accompanying diagrammatic drawing in which the apparatus shown consists of a hydrogen chloride generator A, a trap B, an alcohol supply tank C, an alcohol vaporizer D, a catalyst vessel E, and a series of scrubbers F, G, and H.

The generator A consists of an acid-proof brick-lined kettle 1 provided with a man-hole 2, a delivery line 3 containing a valve 4, heating coils 5 and 6 containing valves 7 and 8 and 9 and 10, respectively, and an outlet line 11 provided with a valve 12. The man-hole, the delivery and outlet lines, and the heating coils are preferably constructed of lead. Steam is the preferred source of heating because its use allows the elimination of fire hazards.

The trap or catch-tank B is usually a lead or brick-lined steel tank. A bottom outlet 14 equipped with a valve 15 is provided for the purpose of allowing the withdrawal of any condensed aqueous hydrochloric acid. A line 16 is provided for the purpose of conducting hydrogen chloride from the trap B to the catalyst vessel E where it is introduced in a suitable manner, as for instance, by a distributor 17. Line 16 is provided with a pressure indicator 18, a valved vent line 19 and a control valve 20.

The alcohol supply tank C and the vaporizer D may be constructed of steel. In order to regulate the rate of feed of the alcohol to the catalyst vessel, it is desirable to set the supply tank C on weigh scales (not shown) or provide it with other suitable regulating means such as sight glass 21. The supply tank is provided with a valved inlet 22 and a valved outlet 23 leading to the vaporizer. Outlet line 23 is provided with a pressure indicator 24. The vaporized alcohol is delivered from the vaporizer D to the catalyst vessel E through line 25 which is provided with valves 26 and 27. The delivery is preferably effected by connecting lines 16 and 25 so that the hydrogen chloride and the alcohol are mixed in the line and pass through the distributor 17 together. This distributor should preferably be near the bottom of vessel E.

The catalyst vessel E is usually constructed of or lined with acid-proof brick. In addition to the distributor 17, it is provided with a valved inlet 28 through which water may be introduced, a means for regulating temperature indicated at 29 and an outlet line 30 provided with a valve 31 for the removal of the evolved gases and vapors from the reaction zone. Line 30 extends to the scrubbing equipment which may conveniently be a series of vessels containing various scrubbing liquids as shown, for instance, by the vessels F, G, and H, vessels F and G being connected by a line 32 and vessels G and H by a line 33 with an outlet line 34 for final recovery of the product.

The apparatus is not limited to the particular type of equipment described, since it will be apparent to those skilled in the art that various other types of equipment and materials of construction may be employed in carrying out the process. The operation of the process is described with reference to the drawing by the following examples. It will be understood that while the preferred embodiments of the process are set forth in the examples, the invention in its broader aspects is not limited by the specific details as to proportions of materials, temperature and conditions of operation.

*Example I*

Approximately 7000 parts of 3 to 5 mesh sodium chloride was added to generator A through manhole 2, and 5000 parts of 78% sulfuric acid was added through line 3 and valve 4. Additional sulfuric acid amounting to about 10,000 parts of 78% sulfuric acid was then gradually added during the course of ten hours. During this time the temperature was gradually raised to 113°–117° C. The last-noted temperature was maintained until the production of hydrogen chloride decreased to an undesirable extent. The rate of sulfuric acid addition and the temperature conditions were at all times regulated so as to give a uniform flow of hydrogen chloride through line 11 and valve 12.

During the first stages of the hydrogen chloride generation, the acid gas was vented to suitable absorption equipment (not shown) through the valved outlet line 19 in line 16. This operation was continued until suitable tests indicated a purity of about 97%. Subsequently, valved outlet line 19 was closed and the acid gas was delivered at a uniform rate to the catalyst contained in vessel E through line 16, valve 20 and distributor 17. Concurrently with the addition of the hydrochloric acid gas, 4782 parts of vaporized ethyl alcohol (92%) was added to the same distributor from the supply tank through valved line 23, vaporizer D and line 25 controlled by valves 26 and 27.

The catalyst contained in vessel E consisted of 2200 parts of 67–70% zinc chloride solution maintained at a temperature of 135°–145° C. The volume of this solution was kept constant by the addition of water through valved inlet 28.

The operation was so adjusted that an appreciable excess (e. g., 20–40% over the theoretical amount required for reaction) of hydrogen chloride was present in the mixture being introduced into the catalyst.

The evolved vapors containing ethyl chloride were allowed to escape through line 30 controlled by valve 31 to scrubbers F, G, and H containing, respectively, water, dilute caustic soda solution and concentrated sulfuric acid. The purified ethyl chloride was then condensed.

The complete operation required about sixteen hours. It produced ethyl chloride in high yield. An undetermined amount of aqueous hydrochloric acid was also recovered. No appreciable ether was produced.

The fluid residue in the hydrogen chloride generator A consisting largely of a solution of acid sodium sulfate, was discharged into a suitable reservoir from which disposal or recovery was subsequently made. No difficulty was encountered in this step. The heating coils were not appreciably coated with solid materials.

*Example II*

The procedure of Example I was followed except that the initial mixture of sodium chloride and sulfuric acid consisted of 3850 parts of sodium chloride and 6200 parts of 77% sulfuric acid. The additional sulfuric acid consisted of 1590 parts of 93% sulfuric acid, making an average acid concentration of about 81.5%. The amount of alcohol corresponded to 1960 parts of 92% alcohol. The operation was carried out for six hours with a a high yield of ethyl chloride. No appreciable ether was produced.

*Example III*

One-third of the liquid residue from a previous charge similar to that described in Example I was retained in the hydrogen chloride generator. When it had cooled to 70°–75° C., 7000 parts of granular sodium chloride was added. The charge was gradually heated to 95°–100° C. Subsequently 15,000 parts of 78% sulfuric acid was added during the course of eight hours and the charge was then gradually heated to 117° C. The hydrogen chloride was brought together with ethyl alcohol (4800 parts of 92%) in the presence of a bismuth chloride solution maintained at a temperature of 130°–140° C. The hydrogen chloride evolved and the alcohol addition were so adjusted that a 10–20% excess of the acid gas over the theoretical requirements was usually present.

An excellent yield of ethyl chloride, with practically no ether, was obtained.

In a similar manner, the process of the invention may be applied to the production of methyl chloride and propyl chlorides from the corresponding alcohols. While the practical operating sulfuric acid concentrations lie between 70% and 87%, the range 77% to 83% gives especially desirable results. It is, moreover, desirable that the average concentration used be within the aforesaid range of concentrations. The amount and concentration of the sulfuric acid is normally such as to produce an acid sodium sulfate concentration of such strength that all portions of this by-product are present as a fluid mass. This has the advantage that it prevents caking of the portions of the charge in contact with the heating coils, facilitates the transfer of heat to the charge and thereby lends uniformity to the operation, enabling uniform production of hydrogen chloride and uniform addition to the catalyst. The regulation of the amount of acid and acid concentration in such a way as to keep the major portion of the charge in the hydrogen chloride generator in fluid condition also facilitates the discharge of the completed reaction mass or any desired part thereof from said generator.

The preferred range of temperatures in the hydrogen chloride generator is from about 90° C. to about 125° C., and especially desirable results have been obtained within the range from about 100° C. to about 115° C. The use of sulfuric acid concentrations or of temperatures below the above noted minima retards to an undesirable degree the generation of hydrogen chloride. The use of too strong sulfuric acid or of too high a temperature may solidify the charge, particularly those portions in contact with the heating coils.

A very coarse grade of sodium chloride is of considerable advantage because it allows practical operation without the use of mechanical agitation. Finely ground granular sodium chloride tends to cake too readily. For efficient operation the sodium chloride particles should be at least one-eighth of an inch in cross-section with no appreciable amount of finer material. Crystals of 3 to 5 mesh are preferred.

Excellent results are also obtained by the addition of an excess of a hydrated acid sodium sulfate prior to the addition of the sulfuric acid to the sodium chloride. Preferably, the acid sodium sulfate is used in the form of a portion of a previous charge. With this modification, it is practical to use finely granular sodium chloride because this fine material tends to float in the heavy acid sulfate liquor and thus caking is prevented. In this type of operation mechanical agitation may be used, although it is not essential.

Ordinarily, the formation of hydrogen chloride and the reaction with the alcohol have been carried out at atmospheric pressures or pressures slightly above atmospheric. However, much higher pressures may be used, if desired.

In the examples, only the use of zinc chloride and bismuth chloride catalysts has been described. It will be understood, however, that the invention is applicable to the use of other catalysts that promote the reaction between alcohols and hydrogen chloride, as disclosed, for instance, in the Frei Patents U. S. Nos. 1,784,423 and 1,824,951. The improvement covered by our U. S. Patent No. 1,983,542 is also applicable to the present process. The use of bismuth catalysts broadly for promoting a reaction of this type is covered in the co-pending application of H. W. Daudt, Serial No. 688,701, filed September 8, 1933. As examples of other specific catalysts which are preferably employed may be mentioned antimony trichloride and ferric chloride.

The process is very advantageous for operation on a large scale because it enables the uniform production of hydrogen chloride and permits synchronization of the addition of alcohol and hydrogen chloride to the catalyst. The separate preparation of the hydrogen chloride from sulfuric acid and sodium chloride in the absence of the alcohol also avoids losses due to the formation of by-products, which losses become relatively large over long periods of time and greatly add to the cost of the process. The operation of the hydrogen chloride generator with such concentrations of sulfuric acid as specified is an important factor in permitting uniformity of operation as contrasted with processes in which concentrated sulfuric acid or too dilute sulfuric acid are employed. Another important consideration is the fact that the above process consumes large tonnages of relatively dilute sulfuric acid that have been recovered from other operations and that otherwise would be wasted or would require a special treatment. Still another advantage is that the corrosion of the lead heating coils is relatively slight, far below that of a process where the mixture of concentrated sulfuric acid and alcohol is added to a dilute sulfuric acid-sodium chloride mixture.

As many apparently widely different embodiments of this invention may be made without departing from the spirit and scope thereof, it is to be understood that we do not limit ourselves to the specific embodiments thereof except as defined in the appended claims.

We claim:

1. The process of producing an alkyl chloride containing less than four carbon atoms by the reaction of hydrogen chloride and the corresponding alkyl alcohol which comprises reacting sodium chloride with sulfuric acid of 70–87% concentration while maintaining the residual product of the reaction in fluid condition at all times by keeping the temperature in the range of 90–125° C. by means of indirect heating with steam and concurrently adding the evolved hydrogen chloride gas and the alcohol in the vapor state, in the ratio of 1.1 to 1.4 mols hydrogen chloride per mol. of alcohol, to an aqueous solution of a metal halide catalyst capable of promoting reaction between the hydrogen chloride and the said alcohol and maintained at a temperature between 130–145° C.

2. The process of producing an alkyl chloride containing less than four carbon atoms by the reaction of hydrogen chloride and the corresponding alkyl alcohol which comprises reacting sodium chloride with sulfuric acid of 77–83% concentration while maintaining the residual product of the reaction in fluid condition at all times by keeping the temperature in the range of 100–115° C. by means of indirect heating with steam and concurrently adding the evolved hydrogen chloride gas and the alcohol in the vapor state, in the ratio of 1.1 to 1.4 mols hydrogen chloride per mol. of alcohol, to an aqueous solution of a metal halide catalyst capable of promoting reaction between the hydrogen chloride and the said alcohol and maintained at a temperature between 130–145° C.

3. The process of producing ethyl chloride by the reaction of hydrogen chloride with ethyl alcohol which comprises reacting sodium chloride with sulfuric acid of 70–87% concentration while maintaining the residual product of the reaction in fluid condition at all times by keeping the temperature in the range of 90–125° C. by means of indirect heating with steam and concurrently adding the evolved hydrogen chloride gas and the alcohol in the vapor state, in the ratio of 1.1 to 1.4 mols hydrogen chloride per mol. of alcohol, to an aqueous solution of a metal halide catalyst capable of promoting reaction between the hydrogen chloride and the said alcohol and maintained at a temperature between 130–145° C.

4. The process of producing ethyl chloride by the reaction of hydrogen chloride with ethyl alcohol which comprises reacting sodium chloride with sulfuric acid of 77–83% concentration while maintaining the residual product of the reaction in fluid condition at all times by keeping the temperature in the range of 100–115° C. by means of indirect heating with steam and concurrently adding the evolved hydrogen chloride gas and the alcohol in the vapor state, in the ratio of 1.1 to 1.4 mols hydrogen chloride per mol. of alcohol, to an aqueous solution of zinc chloride maintained at a temperature between 135–145° C.

5. The process of producing ethyl chloride by the reaction of hydrogen chloride with ethyl alcohol which comprises reacting sodium chloride with sulfuric acid of 77–83% concentration while maintaining the residual product of the reaction in fluid condition at all times by keeping the temperature in the range of 100–115° C. by means of indirect heating with steam and concurrently adding the evolved hydrogen chloride gas and the alcohol in the vapor state in the ratio of 1.1 to 1.4 mols hydrogen chloride per mol. of alcohol to an aqueous solution of a metal halide catalyst capable of promoting reaction between the hydrogen chloride and the said alcohol and maintained at a temperature between 130–145° C.

6. A process according to claim 1 in which the sodium chloride and sulfuric acid are brought together in the presence of hydrated acid sodium sulfate in the fluid state.

LEE CONE HOLT.
HERBERT WILKENS DAUDT.